United States Patent
Yamada et al.

(10) Patent No.: US 8,570,464 B2
(45) Date of Patent: Oct. 29, 2013

(54) OPTICAL FILTER, SOLID-STATE IMAGING ELEMENT HAVING THE FILTER, AND IMAGING APPARATUS

(75) Inventors: Tomohiro Yamada, Yokohama (JP); Ryo Kuroda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 114 days.

(21) Appl. No.: 12/824,067

(22) Filed: Jun. 25, 2010

(65) Prior Publication Data
US 2010/0328587 A1      Dec. 30, 2010

(30) Foreign Application Priority Data
Jun. 30, 2009   (JP) ................................. 2009-155666

(51) Int. Cl.
*G02F 1/1335*   (2006.01)
*G02B 5/22*   (2006.01)

(52) U.S. Cl.
USPC ............................ 349/106; 359/885; 359/891

(58) Field of Classification Search
None
See application file for complete search history.

(56) References Cited

U.S. PATENT DOCUMENTS

| | | | |
|---|---|---|---|
| 2006/0186319 A1* | 8/2006 | Mouli ........................ | 250/208.1 |
| 2008/0030657 A1* | 2/2008 | Wu et al. ....................... | 349/106 |
| 2008/0129936 A1* | 6/2008 | Seo ............................... | 349/106 |
| 2009/0116029 A1* | 5/2009 | Ohtera et al. ................. | 356/456 |
| 2009/0284696 A1* | 11/2009 | Cheong et al. ................ | 349/106 |
| 2010/0140461 A1* | 6/2010 | Sprigle et al. ................ | 250/226 |

FOREIGN PATENT DOCUMENTS

| | | |
|---|---|---|
| JP | 2005202104 A | 7/2005 |
| JP | 2007-41555 A | 2/2007 |

OTHER PUBLICATIONS

Kanamori et al., in "Fabrication of Transmission Color Filters Using Silicon Subwavelength Gratings on Quartz Substrates", IEEE Photonics Technology Letters,vol. 18, No. 20, Oct. 15, 2006.
Kanamori,"Fabrication of Color Filters for Display by Nanoimprint Lithography", The Japan Society of Applied Physics, 2005, No. 2.
Kanamori,"Subwavelength Grating", 2005, vol. 74, No. 7.
Kanamori,"Development of Color Filter", Mar. 2009, pp. 32-39.
Kanamori,"Fabrication of Color Filters for Display by Nanoimprint Lithography", The Japan Society of Applied Physics, 2005, No. 2. (original and English translation thereof are enclosed as a supplement to IDS filed Jul. 2, 2013).
Kanamori,"Subwavelength Grating", 2005, vol. 74, No. 7. (original and English translation thereof are enclosed as a supplement to IDS filed Jul. 2, 2013).
Kanamori,"Development of Color Filter", Mar. 2009, pp. 32-39. (original and English translation thereof are enclosed as a supplement to IDS filed Jul. 2, 2013).

* cited by examiner

*Primary Examiner* — Hemang Sanghavi
(74) *Attorney, Agent, or Firm* — Canon U.S.A., Inc. IP Division

(57) ABSTRACT

An optical filter includes a substrate, and a periodic structure in which a plurality of members formed of silicon are periodically arranged on a surface of the substrate. The filter selectively transmits light of a first wavelength included in light incident on the periodic structure in the direction of the substrate. The members are two-dimensionally arranged with a period of 400 nm to 500 nm. The dimension of the members in the direction parallel to the surface is of 120 nm to 160 nm. A local maximum value of the transmission spectrum of the first wavelength is within the range of 400 nm to 500 nm.

15 Claims, 9 Drawing Sheets

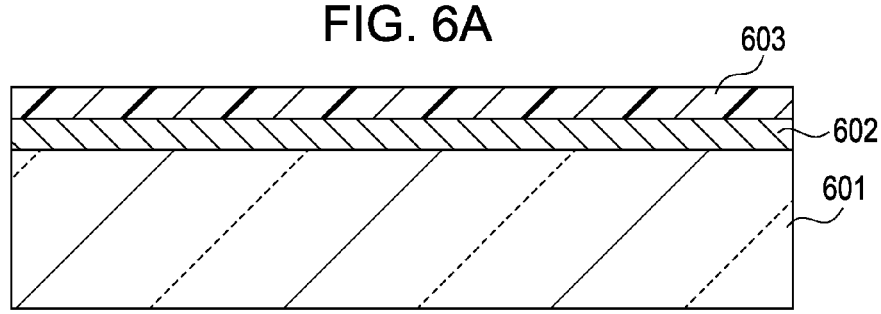
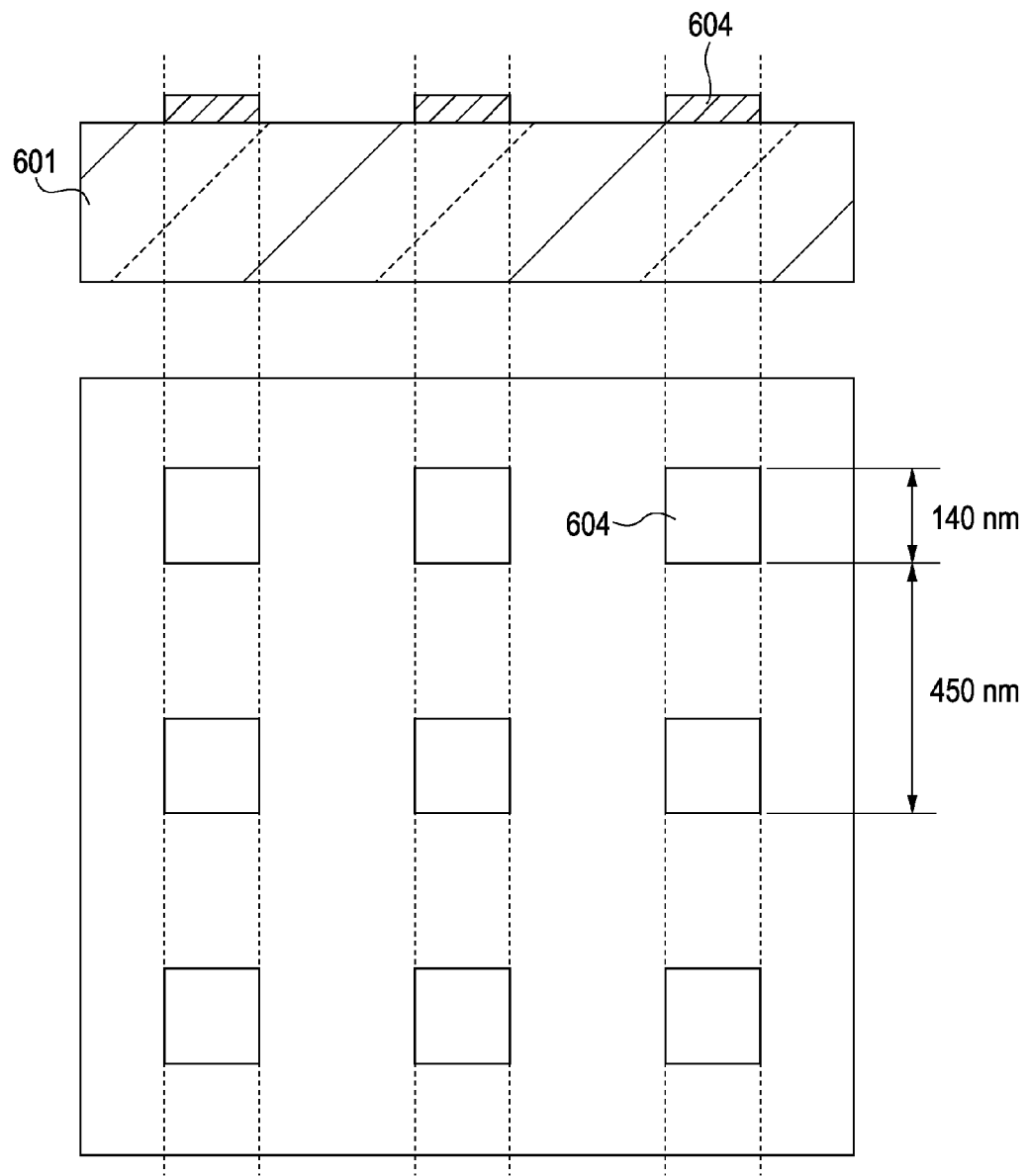

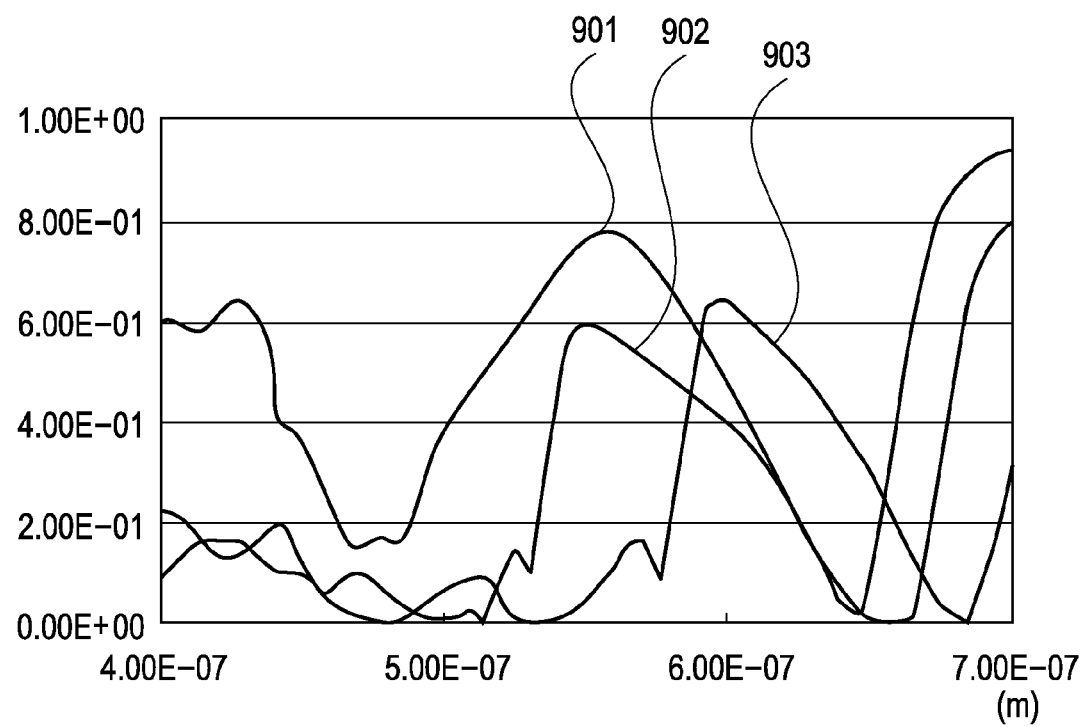

OPTICAL FILTER, SOLID-STATE IMAGING ELEMENT HAVING THE FILTER, AND IMAGING APPARATUS

BACKGROUND OF THE INVENTION

1. Field of the Invention

The present invention relates to an optical filter using guided mode resonance.

2. Description of the Related Art

In recent years, separately from the conventional color filter using pigment, a color filter using guided mode resonance (GMR) or Guided Resonance (GR) Mode has been proposed. The color filter using guided mode resonance takes advantage of a resonance condition between diffracted light and a waveguide mode occurring in a waveguide. Optical filters based on GMR are considered to provide high light use efficiency and a sharp resonance spectrum.

Kanamori et al., in "Fabrication of Transmission Color Filters Using Silicon Subwavelength Gratings on Quartz Substrates", IEEE Photonics Technology Letters, Vol. 18, No. 20, Oct. 15, 2006 (hereinafter referred to as Literature 1) discloses a color filter that includes a one-dimensional diffraction grating formed of silicon and uses the guided mode resonance occurring in the silicon periodic structure.

The filter disclosed in Literature 1 transmits RGB (Red, Green, and Blue) portions of the incident light having a particular polarization component. TE polarized light is made to be incident on a filter for red and a filter for green, and TM polarized light is made to be incident on a filter for blue.

Japanese Patent Laid-Open No. 2007-41555 (hereinafter referred to as Literature 2) discloses a filter that includes a two-dimensional diffraction grating formed of silicon and transmits R and G light. Literature 2 states that making the diffraction grating perfectly two-dimensional can reduce polarization dependency.

The color filter disclosed in Literature 1 uses a one-dimensional diffraction grating, therefore the angle between the grating structure of the diffraction grating and polarized light incident thereon may have various values depending on the angle of incident polarized light, and therefore the transmission property thereof has strong polarization dependency. Such strong polarization dependency causes inconvenience, for example, when the filter is used in an image sensor of a digital camera or the like.

Although Literature 2 discloses that use of a two-dimensional diffraction grating reduces the polarization dependency of color filters for red and green, a color filter for blue, which constitutes the three primary colors, is not achieved.

In view of the use in an image sensor for picking up a color image, it is desirable to achieve a color filter that transmits the three primary colors including blue with a high transmittance.

SUMMARY OF THE INVENTION

In an aspect of the present invention, an optical filter includes a substrate, and a periodic structure in which a plurality of members formed of silicon are periodically arranged on a surface of the substrate. The filter selectively transmits light of a first wavelength included in light incident on the periodic structure in a direction of the substrate. The members are two-dimensionally arranged with a period of 400 nm to 500 nm. The dimension of the members in a direction parallel to the surface is of 120 nm to 160 nm. A local maximum value of the transmission spectrum of the first wavelength is within the range of 400 nm to 500 nm.

The present invention can provide an optical filter that has a minimized dependency on the polarization of incident light and has high transmittance in the wavelength region of blue light.

Further features of the present invention will become apparent from the following description of exemplary embodiments with reference to the attached drawings.

BRIEF DESCRIPTION OF THE DRAWINGS

FIGS. 6A and 6B are explanatory views of a first embodiment of the present invention.

FIG. 9 is a graph showing the relationship between wavelength and transmittance calculated on the basis of a conventional optical filter.

DESCRIPTION OF THE EMBODIMENTS

Figure 1:
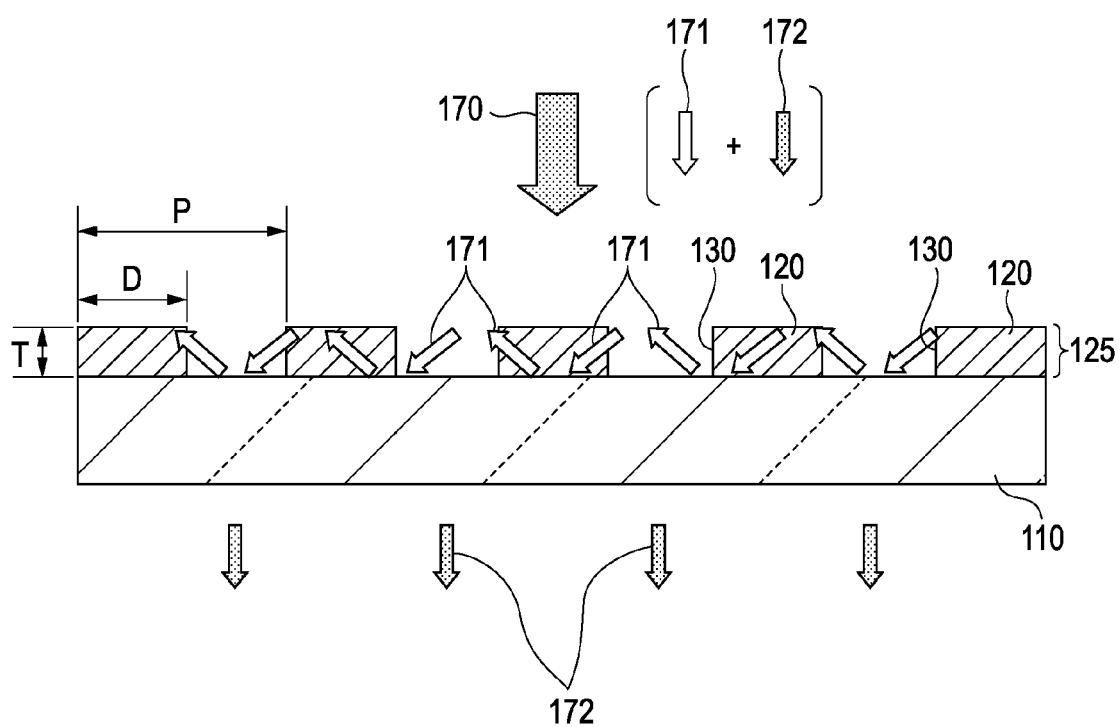
FIG. 1 is a schematic view showing the principle of the present invention.

The color filter disclosed in Literature 1 includes a one-dimensional diffraction grating formed of silicon and uses the guided mode resonance (GMR) occurring in the silicon periodic structure.

The filter transmits RGB (Red, Green, and Blue) portions of the incident light having a particular polarization component. TE polarized light is made to be incident on a filter for red and a filter for green, and TM polarized light is made to be incident on a filter for blue.

That is to say, Literature 1 positively uses the polarization dependency of a one-dimensional diffraction grating formed of silicon to manifest the color property.

The inventors inferred that the reason is that if a filter for blue light such that TE polarized light is to be incident on a one-dimensional diffraction grating is designed, the loss in the blue wavelength region is high, it is difficult to increase the transmittance, and it is difficult to design an element structure having a local maximum value of the transmittance in the blue wavelength region.

So, the inventors calculated by numerical calculation the transmittance to wavelength in the case where a color filter is configured by simply two-dimensionalizing the one-dimensional diffraction grating described in Literature 1 in order to eliminate the polarization dependency, which is the problem in the color filter disclosed in Literature 1.

FIG. 9 is a graph showing the relationship between wavelength and transmittance based on the calculation result. The calculation was performed by the Transfer Matrix Method (TMM method).

FIG. 9 shows that the spectrum 901 of B (blue) has a local maximum value of the transmittance near 580 nm, which is far off the wavelength region of blue light.

The reason is that owing to the two-dimensional structure, it is impossible to selectively manifest only the optical property in the case of the incidence of TM polarized light (Transverse Magnetic Wave) on a one-dimensional diffraction grating, and the property of the TE wave (Transverse Electric Wave) is strongly manifested. That is to say, in a two-dimensional structure (dot array structure), not a simple TE mode or TM mode occurring in the case of a one-dimensional waveguide structure but a complex mixture of these occurs.

It is considered that a complex mixture of TE mode and TM mode manifests itself also in the two-dimensionalized spectrum 902 of G (green) and the two-dimensionalized spectrum 903 of R (red).

The above spectra 902 and 903, which are manifested by optical elements obtained by two-dimensionalizing diffraction gratings corresponding to a filter for R (red) light and a filter for G (green) light, have local maximum values of the transmittance at roughly the same wavelengths as the spectra in the case of the one-dimensional structure. However, this should be considered coincidental.

On the other hand, the wavelength and spectrum shape of GR (guided resonance) can be roughly predicted if the periodicity and effective refractive index of the waveguide structure are obtained.

However, the effective refractive index of the waveguide (and effective periodicity) can be accurately derived only when the refractive index distribution of the waveguide is close to the slab waveguide, that is to say, when the Filling Factor is extremely high or low. When the Filling Factor is moderate, it is not easy to control the GR wavelength and spectrum shape thereof. Thus, it is difficult to obtain a desired optical spectrum.

For this reason, it is actually difficult to analytically predict the structure of an optical element having a desired optical property.

This is proved by the fact that, actually, as described above, in Literature 2, filters configured to transmit R and G light using a two-dimensional diffraction grating formed of silicon are disclosed, but a filter configured to transmit B (blue) light using a two-dimensional diffraction grating is not achieved.

The property of an optical filter used in an imaging element or the like is desirably such that the local maximum value of the transmittance is 80% or more and, in order to obtain a good color property, the local minimum value of the transmittance is 40% or less. In Literatures 1 and 2, of course, this is not achieved in an optical filter having a two-dimensional structure for B (blue).

The present invention was made after intensive research on an optical filter including a structure in which fine structures formed of semiconductor are two-dimensionally periodically arranged on a transparent substrate (dielectric).

An optical filter provided by the present invention includes a substrate, and a periodic structure in which a plurality of members formed of silicon are periodically arranged on a surface of the substrate. The filter selectively transmits light of a first wavelength included in light incident on the periodic structure in the direction of the substrate. The members are two-dimensionally arranged with a period within the range of 400 nm to 500 nm. The dimension of the members in the direction parallel to the surface is within the range of 120 nm to 160 nm. A local maximum value of the transmission spectrum of the first wavelength is manifested within the range of 400 nm to 500 nm.

The present invention can provide an optical filter in which the transmittance is high in each of the wavelength regions of three primary colors including the wavelength region of blue, and the transmission spectrum width is narrow.

The optical filter may further include an optical filter element including a plurality of members two-dimensionally arranged with a period within the range of 400 nm to 500 nm. The dimension of the members in the direction parallel to the surface being within the range of 200 nm to 240 nm. The optical filter element manifests a local maximum value of the transmission spectrum within the range of 600 nm to 700 nm, and is disposed on a different surface of the substrate.

The optical filter may further include an optical filter element including a plurality of members two-dimensionally arranged with a period within the range of 400 nm to 500 nm. The dimension of the members in the direction parallel to the surface being within the range of 160 nm to 200 nm. The optical filter element manifests a local maximum value of the transmission spectrum within the range of 600 nm to 700 nm, and is disposed on a different surface of the substrate.

The thickness of the members formed of silicon may be within the range of 50 nm to 150 nm.

In another aspect of the present invention, a solid-state imaging element includes such an optical filter. In another aspect of the present invention, an imaging apparatus includes such a solid-state imaging element.

When a waveguide structure formed of dielectric or semiconductor has a periodic structure in the in-plane direction thereof, diffracted light due to this periodic structure couples to the in-plane waveguide mode, and a mode thereby occurs. GR mode means such a mode.

At the wavelength where the GR mode occurs, a reflectance of 100% is possible in theory if the waveguide layer has no loss. In terms of transmission spectrum, the transmittance decreases even to 0% in theory at the wavelength of the GR mode.

That is to say, when this waveguide layer structure is used as a transmissive optical filter, the transmission spectrum thereof can be shaped to a desired shape by appropriately controlling the waveguide layer structure and setting the wavelength of the above GR mode to a desired wavelength.

In the wavelength band on the long wavelength side of the wavelength where the GR mode can occur, the transmittance increases sharply. Therefore, in order to exclude such a wavelength region from the wavelength region to which attention is paid, an element structure in which the longest GR mode is as long as possible is desirable.

An actual material has an optical propagation loss. Therefore, when designing an optical element, it is necessary not only to determine the GR wavelength by considering optical periodicity but also to consider the effect of transmittance reduction due to propagation loss.

The optical element of the present invention uses a region where the transmittance is maximum between regions where the transmittance is minimum occurring owing to the GR mode. That is to say, the wavelength used in the present invention is a part where the transmittance peaks between a GR mode and another GR mode.

The optical element of the present invention can also be regarded as a waveguide layer having a two-dimensional structure.

The propagation mode in a waveguide layer having a two-dimensional structure is, as described above, not a simple TE mode or TM mode in a one-dimensional diffraction grating. Basically, GR occurs when the propagation constant of a complexly mixed mode is equal to the wave number in the periodic structure of diffracted light due to the periodic structure.

The optical element of the present invention is designed to manifest the GR wavelength in a short wavelength region (shorter than the wavelength region of blue) and a long wavelength region (wavelength region from green to red) and to thereby locate a local maximum value of the transmittance in the wavelength region of blue.

That is to say, the periodic structure is shortened to increase the wave number of diffracted light introduced into the waveguide layer, and the GR wavelength is shortened. In addition, the waveguide thickness is reduced and the mode interval is increased to manifest the GR wavelength on the long wavelength side from green to red.

However, when the period of the structure is short, Filling Factor generally increases. As a result, especially in the wavelength region of blue, the propagation loss in the waveguide layer increases.

Focusing attention on this point brings a reduction in transmittance maximum. Therefore, with this principle only, it is difficult to design an optical filter having a desirable optical property in the wavelength range of blue. In addition, the TE mode is high in diffraction efficiency compared to the TM mode, and is easily introduced into the waveguide layer. Therefore, the loss during propagation through the waveguide layer is likely to be large. Therefore, the Filling Factor of the waveguide layer where a mixture of TE mode and TM mode manifests itself is desirably low.

However, if a structure having a small Filling Factor and a short period is formed of silicon, which is a material having a high refractive index, the actual dimension thereof is very small.

The element structure for manifesting the function as an optical element is difficult or impossible to fabricate. Therefore, this design principle is not suited for application to actual element design, either.

After intensive research based on these situations, the inventors propose an element having a low loss and high contrast and in addition a realistic dimension such that the element can actually be fabricated. Specifically, the inventors propose a desirable element configuration that has a local maximum value of the transmittance of 80% or more and a local minimum value of 40% or less in the wavelength region of blue and therefore has an optical property suitable as an optical element used in an imaging device.

The design principle for such an optical element is as follows. The wavelength of GR is basically determined by the optical period of the structure. Since the structure is a periodic structure, the periodicity diffracts incident light, and a part thereof is introduced into the waveguide layer. Therefore, the wavelength at which the GR mode manifests itself increases with the increasing periodicity of the periodic structure.

For example, in order to manifest GR modes and transmittance maximum therebetween on the short wavelength side, it is desirable to shorten the pitch of the periodic structure or to reduce the ratio of the Si dots to the periodic structure. That is to say, it is desirable to reduce the Filling Factor and to lower the effective refractive index of the waveguide so that GR modes manifest themselves in a desired short wavelength region.

On the other hand, the local maximum value of the transmittance between GR modes is affected by the Filling Factor. That is to say, the loss at the local maximum value of the transmittance is attributed to the absorption of light propagating through Si, and therefore, there is a negative correlation between transmittance and Filling Factor of the waveguide structure.

On the basis of this correlation, the Filling Factor of the waveguide structure is designed in such a manner that a desired local maximum value of the transmittance can be obtained.

In consideration of these conditions, design was performed, and the present invention provides a structure of an optical filter having a desirable optical property in the wavelength region of B (blue).

The embodiments of the present invention will be described. FIG. 1 is a schematic view showing the principle of the optical element of the present invention. In FIG. 1, reference numeral 110 denotes a substrate, and reference numeral 120 denotes members that are formed of silicon having a refractive index higher than that of the substrate 110. Members (also referred to as "dots") 120 are shown as square for ease of illustration, but can be rectangular, polygonal, circular, or other shapes. On the substrate 110, a plurality of the members 120 formed of silicon are periodically arranged with a space 130 therebetween. Reference numeral 125 denotes a periodic structure formed of the members 120. Reference letter D denotes the dimension of the members 120 in the direction parallel to the surface of the substrate, and reference letter P denotes the period (pitch) at which the members 120 are arranged. Reference letter T denotes the thickness of the members 120. Reference numeral 170 denotes light incident on the periodic structure 125. This light includes at least light 172 having a first wavelength and light 171 having a second wavelength.

In FIG. 1, the light 171 having the second wavelength couples to a waveguide mode occurring in the periodic structure 125 and propagates (GR mode), but the light 172 having the second wavelength does not couple and is selectively transmitted by the substrate 110. Accordingly, FIG. 1 schematically shows an example of a wavelength-selective filter (optical filter) using the principle of guided mode resonance.

Next, the optical filter of the present invention will be described with reference to FIGS. 2A and 2B.

Figure 2A:
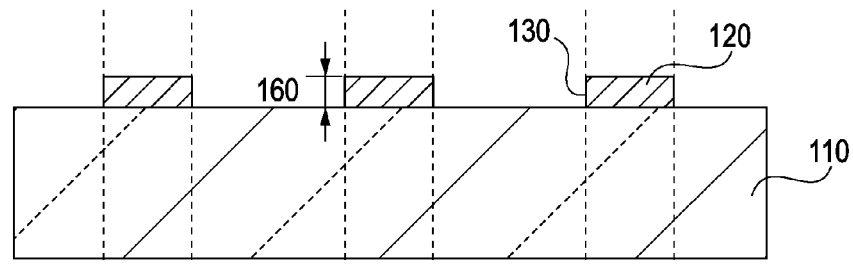
FIGS. 2A and 2B are schematic views showing an example of the present invention.
Figure 2B:
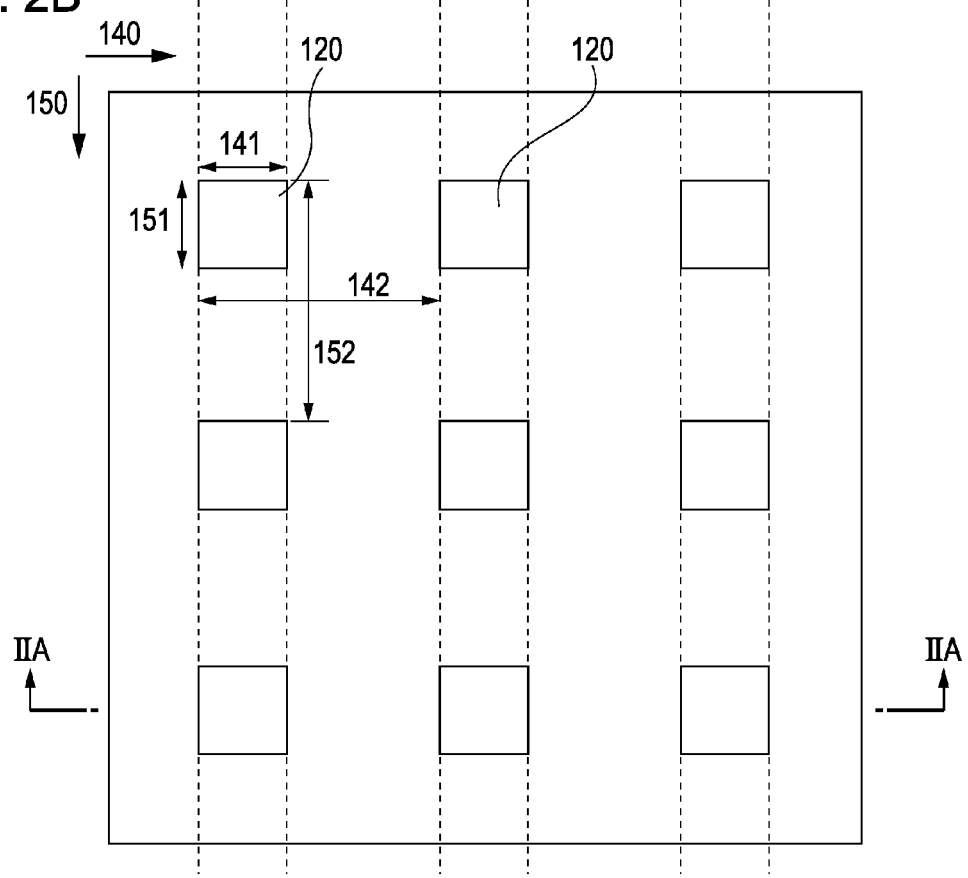

FIGS. 2A and 2B show an array of dots 120 that are periodically arranged on a quartz substrate (dielectric material) 110 and that are formed of silicon (Si). FIG. 2A is a sectional view taken along line IIA-IIA of FIG. 2B.

In the structure shown in FIGS. 2A and 2B, the Si dot array layer has a periodic structure, and therefore this layer functions as a diffraction grating. In addition, compared to the quartz substrate 110, Si has a high refractive index in the wavelength region of visible light. Therefore, the Si dot array layer can be made to function as a waveguide layer.

The Si dots have a first length 141 and a first period 142 in a first direction 140, a second length 151 and a second period 152 in a second direction 150, and a thickness 160.

In view of the reduction of incident polarization dependency of the optical filter of the present invention, it is desirable that the first length 141 be equal to the second length 151, and for the same reason, it is desirable that the first period 142 be equal to the second period 152. In FIGS. 2A and 2B, the Si dots are shown as square for ease of illustration. However, the dots may be rectangular, polygonal, circular, or other shapes that can be repeated periodically. In the case of a circular shape, the size of dots means the diameter of a circle.

For example, when incident light is perpendicularly incident on this silicon dot array structure, the periodic structure functions as a diffraction grating. Therefore, when the incident light has a predetermined wavelength, diffracted light occurs, and a part thereof is introduced into a waveguide layer that is the dot array layer.

After propagating over some distance through the waveguide layer, waveguided light is radiated outside the waveguide layer. At this time, waveguided light can be radiated to both the air side and the substrate side. When the radiated light is opposite in phase to the incident light, the interference of the two decreases the intensity of light on the exit side of the waveguide layer.

Figure 3:
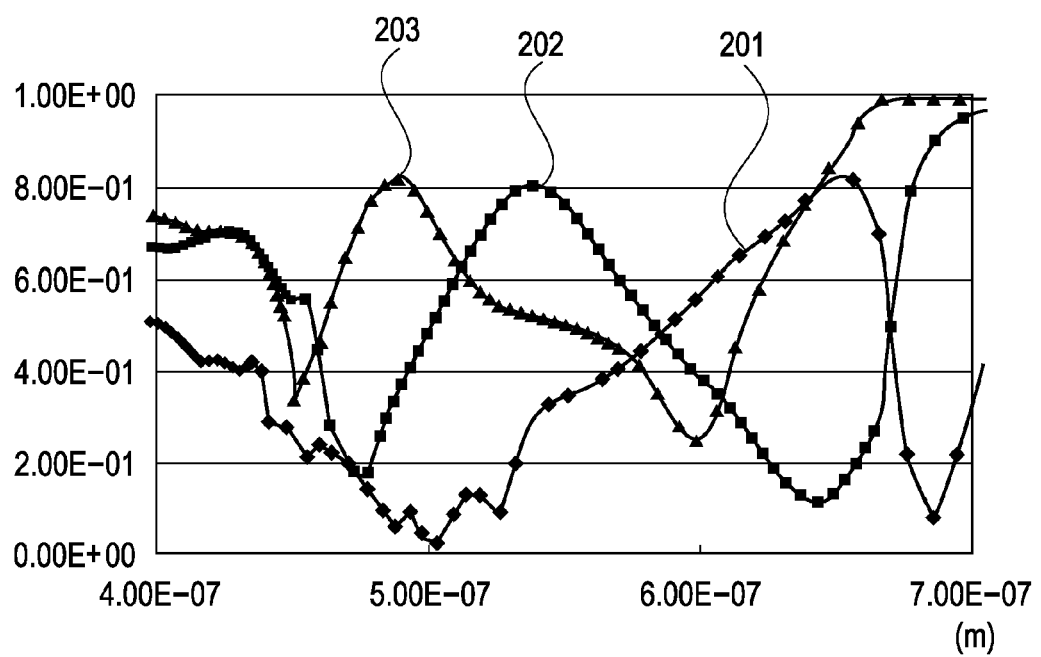
FIG. 3 is a graph showing transmittance of an optical filter in accordance with an embodiment of the present invention.

FIG. 3 shows measurements of transmission spectra. As shown in FIG. 3, the transmittance (vertical axis) decreases at the wavelength (horizontal axis) at which the GR mode occurs, and a valley occurs in the transmission spectrum. The transmission spectrum R 201 of FIG. 3 is a transmission spectrum in the case where the semiconductor material that forms the semiconductor layer is Si, the dot diameter thereof is 220 nm, the period thereof is 440 nm, and the thickness thereof is 100 nm.

The transmission spectrum G 202 is a transmission spectrum in the case where the dot diameter is 170 nm, the period is 460 nm, and the thickness is 100 nm. The transmission spectrum B 203 is a transmission spectrum in the case where the dot diameter is 140 nm, the period is 450 nm, and the thickness is 100 nm.

Therefore, as shown in FIG. 3, for example, by producing valleys at the wavelengths of red and blue light in the visible range by GR in the transmission spectrum, a peak (local maximum value) can be produced at the wavelength of green light therebetween. By performing spectrum shaping in this manner, in the present invention, a transmissive RGB color filter can be formed of semiconductor and dielectric members.

The method for forming a valley of transmittance on the spectrum is not limited to the manifestation of the above-described GR mode, and may be another mechanism (for example, Wood's anomaly or Fano-type resonance).

The silicon members that form the periodic structure of the present invention may be arranged in a square lattice, in a triangular lattice, or in a hexagonal lattice. Arranging in a triangular lattice or in a hexagonal lattice is expected to reduce the polarization dependency of the optical property of the optical filter of the present invention, or to reduce the change in optical property due to oblique incidence. In the case of a square lattice, however, the design of the optical property is facilitated.

In the case where the optical filters of the present invention are arranged, for example, on the surface (in plane) of the same supporting substrate, it is desirable to arrange the optical filters corresponding to RGB colors in a Bayer arrangement if the optical filters are used on an imaging sensor.

Figure 4:
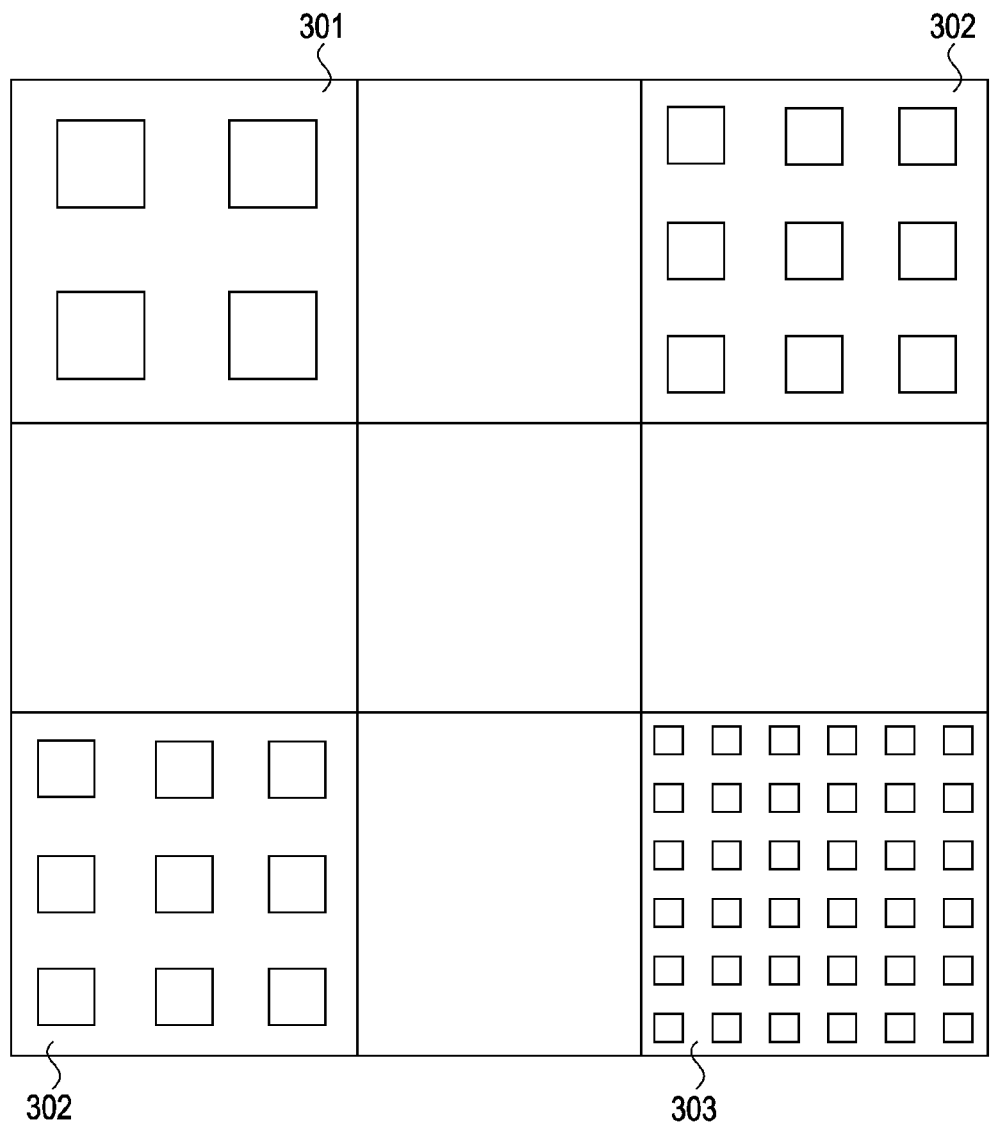
FIG. 4 is a schematic view showing an example of the present invention.

FIG. 4 shows an example of a Bayer arrangement. In FIG. 4, the region R 301 is a silicon periodic structure (fine structure) functioning as a red color filter, the regions G 302 are silicon periodic structures (fine structures) functioning as green color filters, and the region B 303 is a silicon periodic structure (fine structure) functioning as a blue color filter. Structures that differ in at least one of the dot diameter and the period, and that are arranged in an array function as a color filter in which RGB primary color filters are arranged in a Bayer arrangement, are expected to form highly efficient optical filters applicable to imaging sensors.

The array of colors is not limited to a Bayer arrangement and is desirably changed according to the intended use.

The arrangement period of the periodic structures and the size of the structures may be uniform or may vary. Groups of periodic structures that differ in the arrangement period and/or the size of structures are desirably disposed in different regions on the dielectric supporting substrate.

In the present invention, the material of the semiconductor layer is not limited to single crystal silicon, and may be amorphous silicon, polysilicon, or the like. Amorphous silicon and polysilicon are easy to form into a thin film compared to single crystal silicon, and are therefore desirable in terms of the simplicity of the manufacturing process.

In the above description, the substrate that supports the silicon members is formed of a dielectric material and specifically of quartz (silicon dioxide). However, the material of the substrate of the present invention is not limited to quartz.

Especially, an insulator having high transparency in the visible wavelength range is suitable. Examples include titanium dioxide and silicon nitride.

Figure 5:
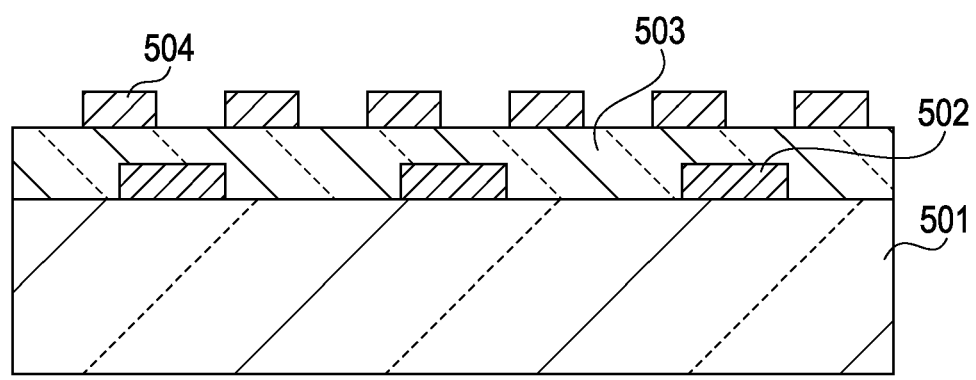
FIG. 5 is a schematic view showing an example of the present invention.

The structure of the optical filter of the present invention is not limited to a single layer structure, and the optical filter may have a laminate structure as shown in FIG. 5. A laminate structure can be formed, for example, by forming a first semiconductor fine structure layer 502 on a supporting substrate 501, forming a transparent dielectric layer 503 thereon, and then forming a second semiconductor fine structure layer 504.

In the case where the optical filter of the present invention has a laminate structure with such a layer spacing that the waveguide modes do not couple, the optical property of the laminated optical filter is basically the product of the optical properties of the layers of the optical filter. Therefore, for example, by laminating two identical optical filter layers, spectrum shaping, such as narrowing the peak width of the transmission spectrum, can be performed.

In contrast, in the case of such a small layer spacing that the waveguide modes of the layers couple, the optical property changes complexly depending on the structure and layer spacing. Therefore, from the viewpoint of ease of optical property design, the layers are desirably spaced so that the waveguide modes of the layers do not couple to each other.

It is also desirable that the periodic structure that forms the optical filter of the present invention be entirely covered with a dielectric that is substantially transparent in the visible light range.

The optical filter of the present invention does not have to be covered with a dielectric protective layer to function. However, by covering the periodic structure with a dielectric layer, oxidation by air and other chemical changes of the periodic structure can be prevented, and the durability can be improved. In addition, foreign substances such as dust can be prevented from attaching to the periodic structure. The optical property of the optical filter of the present invention can thereby be stabilized.

In the case where the dielectric that covers the periodic structure has the same permittivity as that of the supporting substrate, and as a result, the clad layers on both sides of the waveguide layer have the same permittivity, this waveguide layer is a symmetric waveguide layer. Compared to an asymmetric configuration, a symmetric waveguide layer is advantageous in that the optical property can be easily designed and the peak width of the GR mode can be narrowed.

If a conventional optical filter, such as a dielectric multilayer filter or a pigment filter, is used in a device, the filter needs to have a film thickness larger than the wavelength of light and specifically a film thickness of about 1 µm or more.

In contrast, in the case of the optical filter according to the present invention, a filter having a waveguide layer about 200 nm or less in thickness can be configured. Even if a protective layer about 100 nm in thickness is formed on the waveguide layer, the total thickness of all layers is about 300 nm at most, and therefore a filter that is small in thickness compared to a conventional filter using pigment or the like can be provided.

Therefore, if the optical filter according to the present invention is used in a light receiving element, such as a CCD sensor or a CMOS sensor, the light receiving element can be reduced in size. In addition, if the optical filter according to the present invention is used in a light receiving element, the shortage of the amount of light received due to the decrease in viewing angle of each pixel with the increase in the number of pixels of the light receiving element can be alleviated.

The present invention is advantageous at least in that a color filter having a film thickness smaller than that of a conventional pigment filter can be configured; the durability is improved compared to that of a color filter formed of an organic material; since it is formed of semiconductor and dielectric materials, it has high affinity with the semiconductor process; it eliminates the need for painting by a batch process; and a desired optical property can be obtained by changing the structure.

In addition, the present invention is advantageous in that owing to the two-dimensional array structure, the incident light polarization dependency of the optical property is minimum compared to that of a conventional optical element having a one-dimensional grating shape.

Furthermore, the present invention is advantageous in that it has a maximum transmittance of 80% or more and a minimum transmittance of 40% or less in a desired wavelength region, and therefore has an excellent optical property of 2 or more in contrast.

The present invention will be described in more detail with specific embodiments.

First Embodiment

Single Layer Structure

In a first embodiment, a description will be given of the structure of an RGB transmission filter, methods for making the filter, and the optical property of the filter.

FIG. 6A shows a dielectric substrate 601 that is a quartz substrate 525 μm thick, on the surface of which a silicon layer 100 nm thick is formed as a semiconductor layer 602, on which a resist layer 603 for electron beam lithography (EB) is applied. In the case where the semiconductor layer 602 is of single crystal, the semiconductor layer 602 can be formed by preparing an SOI (Silicon On Insulator) substrate and reducing the thickness of the thin film silicon layer thereof. However, the method for forming the semiconductor layer 602 is not limited to the above, and any method known to a person of ordinary skill in the art may be used.

Next, the resist 603 is patterned using an EB lithography apparatus. A resist pattern in which squares about 140 nm on a side are arranged in a square lattice with a period of about 450 nm is formed. Using this resist pattern as an etching mask, and using a plasma of fluorine-based mixture gas, dry etching is performed. Thus, a semiconductor periodic structure 604 is formed as shown in FIG. 6B. Dry etching gas is not limited to fluorine-based gas. Examples of dry etching gas include argon gas, chlorine gas, and oxygen gas.

The method for forming the etching mask is not limited to EB lithography. The etching mask may be formed by photolithography or the like. The semiconductor periodic structure 604 may be formed by forming a resist pattern on the dielectric substrate 601 by EB lithography or photolithography, forming a semiconductor layer 602 thereon, and then performing the liftoff process.

The resist pattern in the case of the liftoff process needs to be an inverse image of the resist pattern in the case of the above-described process.

The semiconductor layer 602 may be directly processed using a focused ion beam processing apparatus (FIB processing apparatus).

Figure 7A:
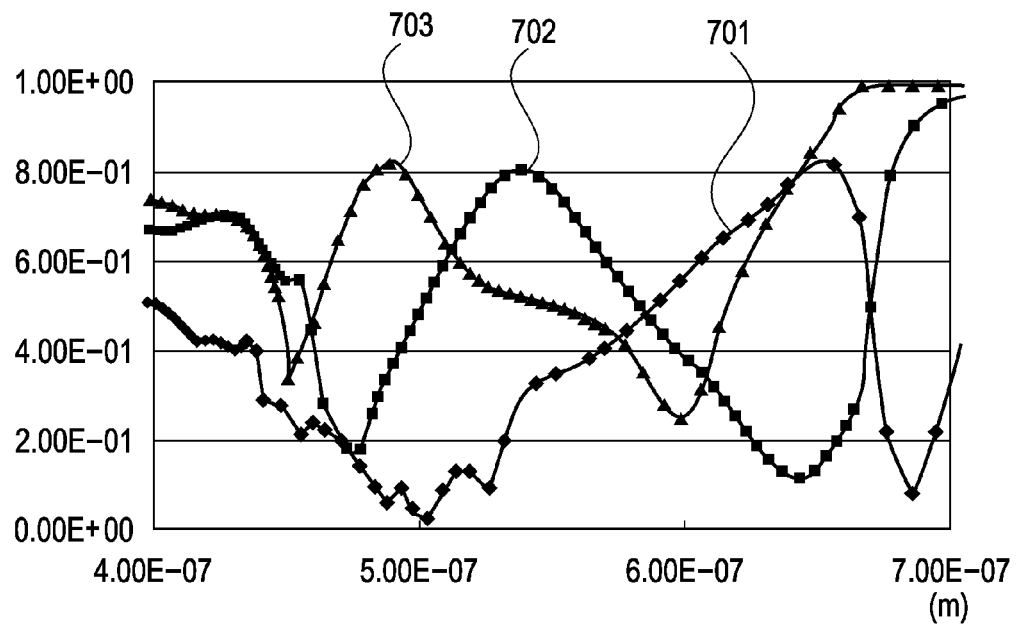
FIGS. 7A and 7B are graphs showing optical properties of an embodiment of the present invention.

FIG. 7A shows the transmission spectra of the optical filter made in this manner. The transmission spectrum B denoted by reference numeral 703 is obtained by numerical calculation. This filter has a local maximum value of the transmittance near 480 nm. The wavelength at which the transmittance peak occurs corresponds to blue in the visible range. This shows that this filter functions as a primary color filter that transmits blue light.

In the case of the periodic structure 604 in which squares about 170 nm on a side and about 100 nm thick are arranged in a square lattice with a period of about 460 nm, the transmission spectrum G denoted by reference numeral 702 is obtained. In the case of the periodic structure 604 in which squares about 220 nm on a side and about 100 nm thick are arranged in a square lattice with a period of about 440 nm, the transmission spectrum R denoted by reference numeral 701 is obtained. These are optical filters that transmit RGB light, and function as primary color filters.

Figure 7B:
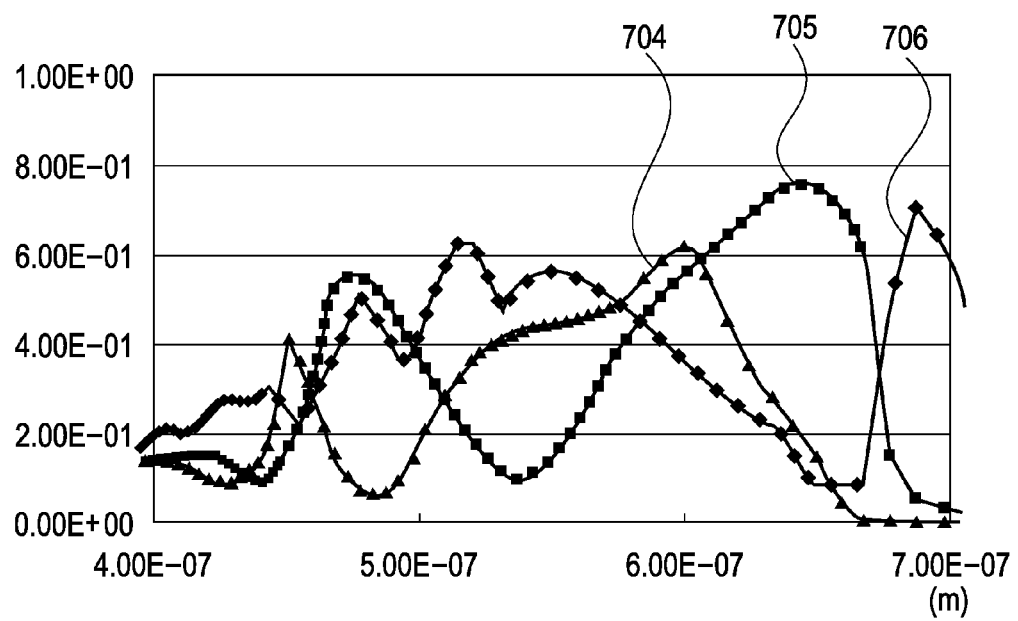

FIG. 7B shows reflection spectra of the optical filter. In the reflection spectrum of the filter of this embodiment, the reflectance is at its minimum at substantially the same wavelength as the wavelength at which the transmittance is at its maximum.

For this reason, when the optical filter of this embodiment that has the transmission spectrum B is used as a reflection filter, the reflection spectrum B denoted by reference numeral 704 in FIG. 7B can be obtained. When the filter that has the transmission spectrum G is used as a reflection filter, the reflection spectrum G denoted by reference numeral 705 can be obtained. When the filter that has the transmission spectrum R is used as a reflection filter, the reflection spectrum R denoted by reference numeral 706 can be obtained. Thus, these optical filters can be made to function as optical filters that strongly reflect complementary red, green, and blue in the visible range.

A solid-state imaging element including the optical filter of this embodiment can be configured, and an imaging apparatus including the solid-state imaging element can be configured.

Second Embodiment

Bayer Arrangement

Figure 8A:
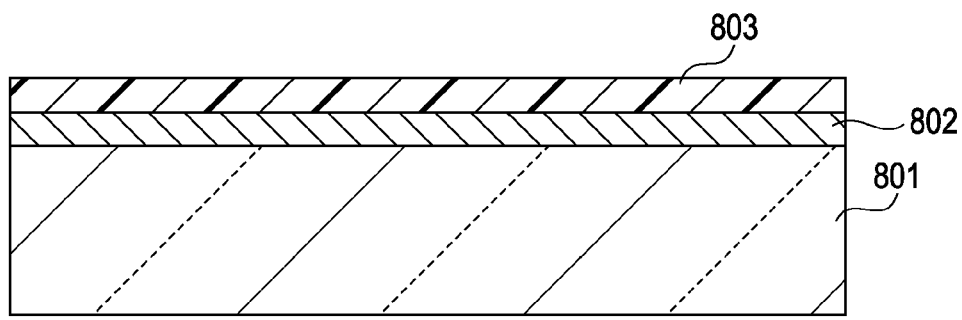
FIGS. 8A and 8B are explanatory views of a second embodiment of the present invention.

In a second embodiment, a description will be given of methods for making an RGB filter having a Bayer arrangement and the optical property of the filter. FIG. 8A shows a dielectric substrate 801 that is a quartz substrate 525 μm thick, on the surface of which a silicon layer 100 nm thick is formed as a semiconductor layer 802, on which a resist layer 803 is applied.

Figure 8B:
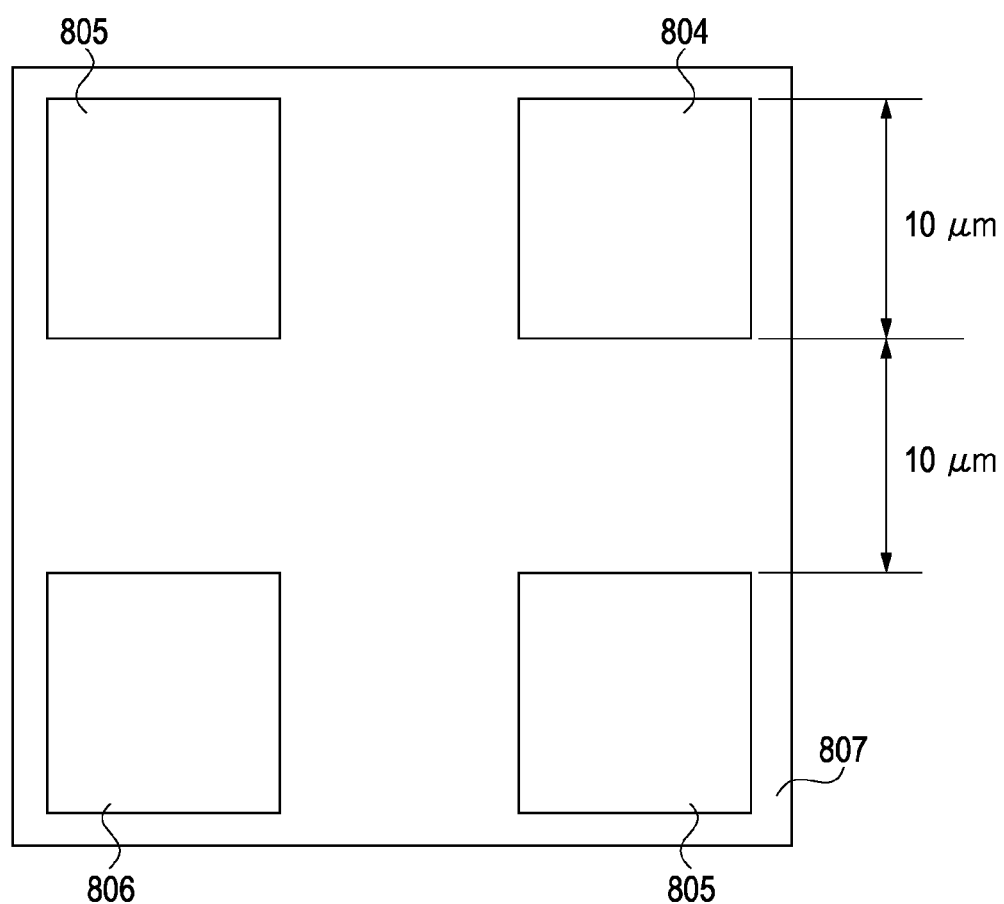

Next, the resist 803 is patterned using an EB lithography apparatus. A portion of the resist pattern that is about 10 μm square and in which squares about 220 nm on a side are arranged in a square lattice with a period of about 440 nm will hereinafter be referred to as a pattern portion A 804. A portion in which squares about 170 nm on a side are arranged in a square lattice with a period of about 460 nm will hereinafter be referred to as a pattern portion B 805. A portion in which squares about 140 nm on a side are arranged in a square lattice with a period of about 450 nm will hereinafter be referred to as a pattern portion C 806. A structure in which these pattern portions are spaced 10 μm apart as shown in FIG. 8B is formed.

Using this resist pattern as an etching mask, and using a plasma of fluorine-based mixture gas, dry etching is performed. Thus, a semiconductor fine structure 807 is formed. The shape of the semiconductor fine structure is not limited to square. It may be regular polygonal or circular. This is for the same reason as the first embodiment.

The region between the above-described pattern portions may be provided with a light blocking layer to prevent color mixing. In addition, if, as in this embodiment, the metal thin film structure forming each pattern portion has the same thickness, each pattern portion can be formed in the same process, and the boundary line between each pattern portion can be eliminated.

The pattern portions A, B, and C formed in this manner have a transmission spectrum R denoted by reference numeral 701, a transmission spectrum G denoted by reference numeral 702, and a transmission spectrum B denoted by reference numeral 703. These can function as primary color filters for RGB.

Furthermore, if, as in this embodiment, all pattern portions have the same thickness, RGB primary color filters can be made in the same batch. This eliminates the need for a process for painting in RGB colors necessary to form a Bayer arrangement structure of conventional color filters using pigment. Therefore, the making process time can be reduced, and the making process can be simplified.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-155666 filed Jun. 30, 2009, which is hereby incorporated by reference herein in its entirety.

What is claimed is:

1. A transmissive optical filter comprising:
   a substrate; and
   a first region in which a plurality of first members formed of silicon are periodically arranged on a surface of the substrate,
   wherein the first members are two-dimensionally arranged on the first region with a period of 400 nm to 500 nm, a dimension of each of the first members in a direction parallel to the surface of the substrate is 120 nm to 160 nm, and the first region has a local maximum value of a transmission spectrum within 400 nm to 500 nm.

2. The transmissive optical filter according to claim 1, further comprising a second region in which a plurality of second members are two-dimensionally arranged with a period of 400 nm to 500 nm, a dimension of each of the second members in the direction parallel to the surface of the substrate being of 200 nm to 240 nm,
   wherein the second region has a local maximum value of the transmission spectrum within 600 nm to 700 nm, and is different from the first region.

3. The transmissive optical filter according to claim 2, further comprising a third region in which a plurality of third members are two-dimensionally arranged with a period of 400 nm to 500 nm, a dimension of each of the third members in the direction parallel to the surface of the substrate being of 160 nm to 200 nm, and
   wherein the third region has a local maximum value of the transmission spectrum within 500 nm to 600 nm, and is different from the first region and the second region.

4. The transmissive optical filter according to claim 1, further comprising an a second region in which a plurality of second members are two-dimensionally arranged with a period of 400 nm to 500 nm, a dimension of the second members in the direction parallel to the surface of the substrate being of 160 nm to 200 nm, and wherein the second region has a local maximum value of the transmission spectrum within 500 nm to 600 nm, and is different from the first region.

5. The transmissive optical filter according to claim 1, wherein a thickness of the first members is 50 nm to 150 nm.

6. The transmissive optical filter according to claim 1, wherein the substrate is formed of dielectric material.

7. The transmissive optical filter according to claim 6, wherein the first region is covered with a dielectric material.

8. The transmissive optical filter according to claim 7, wherein the permittivity of the dielectric material of which the substrate is formed is equal to the permittivity of the dielectric material that covers the first region.

9. The transmissive optical filter according to claim 7, wherein a periodic structure is formed on the dielectric material covering the first region.

10. The transmissive optical filter according to claim 6, wherein the dielectric material is silicon dioxide.

11. A solid-state imaging element comprising the transmissive optical filter according to claim 1.

12. An imaging apparatus comprising the solid-state imaging element according to claim 11.

13. The transmissive optical filter according to claim 3, wherein the first region, the second region and the third region are arranged in a Bayer arrangement.

14. The transmissive optical filter according to claim 1, wherein, the local maximum value of the transmission spectrum is 80% or more.

15. The transmissive optical filter according to claim 1, wherein the first region has a local minimum value of the transmission spectrum within 500 nm to 700 nm, and the local minimum value of the transmission spectrum is 40% or less.

* * * * *